Sept. 7, 1954  O. T. FUNDINGSLAND  2,688,705
MODULATOR VOLTAGE REGULATOR
Filed Feb. 5, 1946

INVENTOR.
OSMUND T. FUNDINGSLAND
BY
ATTORNEY

Patented Sept. 7, 1954

2,688,705

UNITED STATES PATENT OFFICE 2,688,705

MODULATOR VOLTAGE REGULATOR

Osmund T. Fundingsland, Arlington, Mass., assignor, by mesne assignments, to the United States of America as represented by the Secretary of the Navy Application February 5, 1946, Serial No. 645,627

11 Claims. (Cl. 307—108)

This invention relates to modulator voltage regulation and more particularly to circuits for regulating the modulator voltage of a line type modulator in the face of abnormal load conditions.

Magnetron sparking is equivalent to an intermittent short-circuited load condition, and when a spark occurs, electrical energy which normally would be absorbed by the magnetron is reflected back into the modulator circuit. This post-pulse inverse charge causes voltage and current transients which may exceed ratings of the modulator components and the magnetron.

One type of circuit for protecting modulators against sparking magnetrons employs a rectifying circuit shunting the pulse forming network of the modulator to dissipate the energy of the post-pulse inverse charge before the next charging cycle is seriously influenced. However, the present invention accomplishes the desired control of excessive modulator voltages more simply by placing a variable resistance in series or shunt with the pulse forming network to limit the charging current on the next charging cycle succeeding a condition of excessive current in the modulator discharge circuit.

An object of this invention is to provide transient voltage regulation of the power supplied to a magnetron (or other oscillator load) by a line type modulator against disturbances caused by sparking magnetrons.

Another object is to protect modulator components against damage by excessive voltages.

Another object is to provide a series circuit for limiting the charging current to a modulator pulse forming network on the next cycle succeeding excessive current in the modulator discharge circuit.

Another object is to provide a shunt circuit for limiting the charging current to a modulator pulse forming network on the next cycle succeeding excessive current in the modulator discharge circuit.

Figure 1:
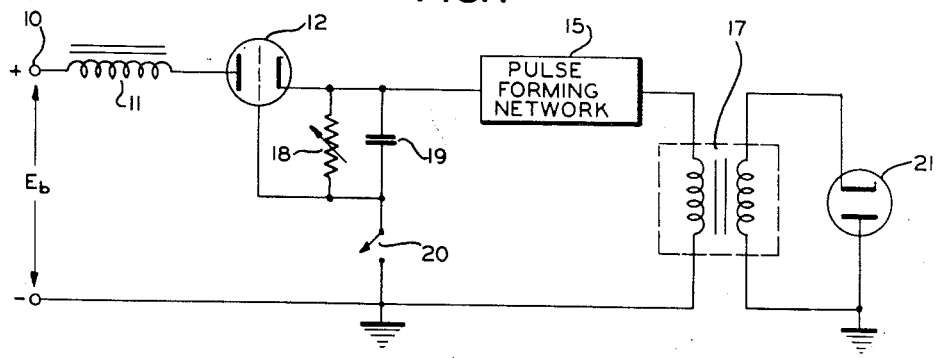
Figure 2:
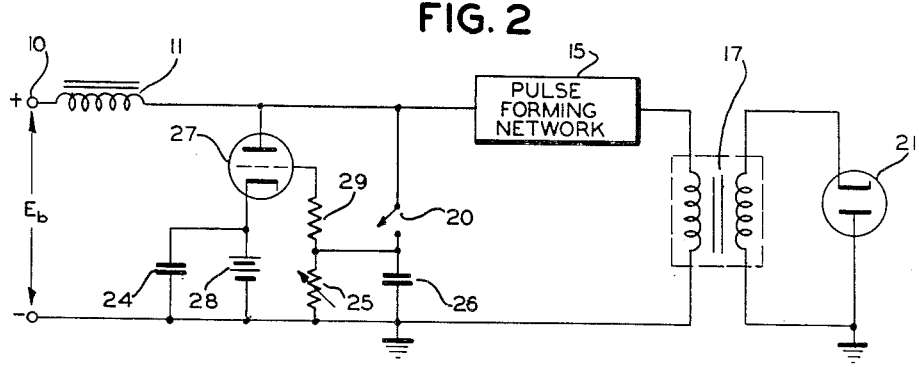

These and other objects and features of this invention will become apparent upon consideration of the following detailed description when taken together with the accompanying drawings, where:

Fig. 1 illustrates a line type modulator with a series circuit for limiting charging current to the pulse forming network; and Fig. 2 illustrates a line type modulator with a shunt circuit for limiting charging current to the pulse forming network, hereinafter referred to as PFN.

In Fig. 1, a source of D. C. power of potential $E_b$ is applied between terminal 10 and ground. In series between terminal 10 and ground are connected charging choke 11, triode 12, PFN 15, and the primary winding of pulse transformer 17. Triode 12 has its plate connected to choke 11 and its cathode connected to PFN 15. The series loop between terminal 10 and ground constitutes a circuit for D. C. resonance charging of PFN 15. The control grid of triode 12 is coupled to the cathode through the parallel combination of variable resistor 18 and capacitor 19. Switch 20, when closed, grounds the grid of triode 12 and also grounds the positively charged side of PFN 15 through resistor 18 and capacitor 19. The PFN 15 is thus discharged through the primary of transformer 17 and pulses magnetron 21, which is connected in series with the secondary of transformer 17.

If magnetron 21 sparks or if a short occurs in pulse transformer 17 or elsewhere in the output circuit and drops the load impedance presented to the modulator, excessive current will flow in the discharge circuit through the R–C network, comprising resistor 18 and capacitor 19 in parallel, in series with switch 20 to ground. Triode 12 has an abruptly saturating plate current versus grid voltage characteristic. Under normal modulator operation, the grid to cathode bias established by the flow of normal discharge current through the resistor 18 and capacitor 19 combination to ground is such as to allow tube 12 to conduct vigorously and to offer minimum impedance to the flow of charging current. However, under sparking magnetron conditions, the increased discharge current is integrated on capacitor 19 and increases the negative bias between grid and cathode of triode 12. The resulting increase in plate-to-cathode impedance of triode 12 lowers the effective Q of the charging circuit and limits the voltage build-up on PFN 15. The abruptly saturating characteristic of triode 12 arises from the requirement that a small change in grid voltage will quickly and effectively limit current flow from the charging source to PFN 15. It will be observed that tube 12 need not be a triode but could be a tetrode, pentode or an intermediate amplifier functioning in the desired manner as described above.

Fig. 2 has the same standard modulator components as Fig. 1 but does not have tube 12 (although a hold-off charging diode may be used in this position if desired), resistor 18 and capacitor 19. Also discharge switch 20 has slightly different connections but remains in the same relative position. Instead of a series impedance to limit charging current after abnormally high discharge current, a shunting arrangement is employed to by-pass charging current from PFN 15 and thus limit its voltage build-up. Switch 20, when closed, discharges PFN 15 through variable resistor 25 and capacitor 26 to ground. Capacitor 26 parallels variable resistor 25. Triode 27 parallels switch 20 to ground with its plate connected to the junction of choke 11 and PFN 15 and its cathode connected to ground through bias battery 28 and capacitor 24 in parallel. The control grid of triode 27 is connected to the upper end of resistor 25 and capacitor 26 through resistor 29. Under normal modulator operation, the grid-to-cathode bias established by the flow of normal discharge current through the resistor 25 and capacitor 26 combination to ground plus the cathode bias of battery 28 is such as to cut tube 27 "off" or to allow it to pass only a very small current. However, under sparking magnetron conditions or a short circuit in the discharging circuit, the increased discharge current builds up the voltage on capacitor 26 and the grid of tube 27 becomes more positive with respect to the cathode potential. This results in increased conduction by tube 27 so that on the next charging cycle, charging current is shunted through tube 27, thereby preventing excessive voltage build-up on PFN 15. By adjustment of the values of resistor 25, capacitor 26 and bias battery 28, it would be possible to adjust the conductivity of tube 27 to make the voltage build-up on PFN 15 lower than normal in order to facilitate the recovery of magnetron 21 from a sparking condition.

In both of the embodiments of this invention described above and illustrated in Figs 1 and 2, a parallel combination of resistor and capacitor is used as a means to detect excessive discharge currents from the pulse forming network of a line type modulator. Variable resistance means in the form of electronic tubes are made to respond to the detecting means in order to limit the charging current to the pulse forming network and thereby to prevent excessive voltage build-up.

Although there are shown and described only certain specific embodiments of this invention, the many modifications possible thereof will be readily apparent to those skilled in the art. Therefore, this invention is not to be limited except insofar as is necessitated by the prior art and the spirit and scope of the appended claims.

What is claimed is:

1. In combination, an electrical network adapted to charge through a first conductive path and to discharge through a second conductive path, means in said second path responsive to excessive discharge current flow for producing a control signal continuing for an interval of time following the termination of said excessive discharge current, and means coupled to said first path and responsive to said control signal for limiting for a preselected interval of time the charging current flow to said network.

2. In combination, a line type modulator including a charging means and a pulse forming network, means responsive to excessive discharge currents from said pulse forming network for producing a control signal, and means coupled to said charging means and responsive to said control signal for limiting charging current flow from said charging means to said pulse forming network.

3. In combination, a line type modulator including a pulse forming network and charging means and discharging means for said network, means coupled to said discharge means for producing a control signal in response to an excessive discharge current flow from said network, said control signal continuing for an interval of time following the time of the termination of said excessive discharge current flow, and means coupled to said charging means and responsive to said control signal for limiting the charging current flow from said charging means to said pulse forming network.

4. In combination, a line type modulator including a pulse forming network and charging means and discharging means for said network, said network intermittently charging through said charging means and intermittently discharging through said discharge means, means in series with said discharge means and responsive to excessive discharge current flow for producing a control signal that is a function of the degree of the excess current flow, said signal continuing for a predetermined interval of time following the time of the termination of said excessive discharge current flow, and means coupled to said charging means and responsive to said control signal for limiting the charging current flow to said network, whereby an excessive discharge current flow from said network limits the charging current flow to said network.

5. In combination, a line type modulator including, a pulse forming network, a utilization circuit, means for charging said network and means for discharging said network through said utilization circuit, said network intermittently charging through said charging means and intermittently discharging through said discharge means and said utilization circuit, means in series with said discharge means and responsive to discharge current flow in excess of a predetermined magnitude for producing a control signal that is a function of the magnitude of said excessive current flow and means coupled to said charging means and responsive to said control signal for limiting the charging current flow to said network.

6. Apparatus as in claim 5 wherein said control signal continues for a predetermined interval of time following the instant of time at which said excess discharge current flow terminates.

7. In an electrical network having a current charging path and a different current discharging path, means coupled to said discharge path and responsive to the discharge current flow for producing a control signal that is a definite function of the magnitude of the discharge current flow, and means coupled to said charging path and responsive to said control signal for controlling the amplitude of said charging current flow.

8. In combination with a network adapted to charge intermittently through a first conductive path and to discharge intermittently through a second conductive path, a second network serially introduced in said second conducting path and providing a voltage thereacross related to the magnitude of said intermittent discharge current, and means responsive to said voltage and coupled to said first path for controlling the impedance presented to said intermittent charging current, the magnitude of said impedance being related to the magnitude of said voltage.

9. In combination with a line type modulator including a pulse forming network and charging means and discharging means therefor, a parallel resistor-capacitor network in series with said discharging means for detecting excessive discharge current, and electron tube means biased by said resistor-capacitor network for limiting charging current from said charging means to said pulse forming network.

10. In combination with a line type modulator including a pulse forming network and charging and discharging means therefor, a triode tube connected in series between said pulse forming network and said charging means, the cathode of said tube being connected to said pulse forming network, a resistor connected in series between said cathode of said tube and said discharging means and coupling the grid of said tube to said cathode, and a capacitor paralleling said resistor, whereby when excessive discharge currents occur, the grid-to-cathode bias of said tube developed by said resistor and said capacitor increases the impedance of said tube and limits the flow of charging current to said pulse forming network.

11. In combination with a line type modulator including a pulse forming network and charging and discharging means therefor, a triode tube having its plate connected to said pulse forming network on the side adjacent said charging means, a battery connected between the cathode of said tube and ground, a first resistor connected to the grid of said tube, a second resistor coupling to ground the end of said first resistor remote from said grid, and a capacitor paralleling said second resistor, said second resistor and said capacitor parallel combination being in series between said discharging means and ground, whereby when excessive discharge currents occur, the grid-to-cathode bias of said tube developed by said second resistor and said capacitor parallel combination and said battery decreases the impedance of said tube and shunts part of the charging current to said pulse forming network.

References Cited in the file of this patent

UNITED STATES PATENTS

| Number | Name | Date |
|---|---|---|
| 2,397,337 | Clough | Mar. 26, 1946 |
| 2,411,898 | Schelleng | Dec. 3, 1946 |
| 2,469,977 | Morrison | May 10, 1949 |